United States Patent
Sugimura

(10) Patent No.: US 8,751,693 B2
(45) Date of Patent: Jun. 10, 2014

(54) APPARATUS FOR AND METHOD OF PROCESSING DATA

(75) Inventor: Naozumi Sugimura, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 615 days.

(21) Appl. No.: 12/978,321

(22) Filed: Dec. 23, 2010

(65) Prior Publication Data

US 2011/0156875 A1 Jun. 30, 2011

(30) Foreign Application Priority Data

Dec. 25, 2009 (JP) ................................ 2009-295946
Dec. 17, 2010 (KR) ........................ 10-2010-0130005

(51) Int. Cl.
*G06F 3/00* (2006.01)
*H04Q 5/22* (2006.01)

(52) U.S. Cl.
USPC ....................... 710/5; 710/6; 710/7; 340/10.1

(58) Field of Classification Search
None
See application file for complete search history.

(56) References Cited

U.S. PATENT DOCUMENTS

| | | | | |
|---|---|---|---|---|
| 5,461,440 | A * | 10/1995 | Toyoda et al. | 396/311 |
| 6,115,104 | A * | 9/2000 | Nakatsuka | 355/40 |
| 7,151,564 | B2 * | 12/2006 | Kubo | 348/231.6 |
| 7,259,786 | B2 * | 8/2007 | Shimizu | 348/231.6 |
| 7,327,390 | B2 * | 2/2008 | Gallagher | 348/224.1 |
| 7,711,879 | B2 | 5/2010 | Yamamoto | |
| 8,041,153 | B2 | 10/2011 | Kaneko et al. | |
| 8,208,763 | B2 | 6/2012 | Hara et al. | |
| 8,305,638 | B2 * | 11/2012 | Katsunoi et al. | 358/1.9 |
| 2002/0054229 | A1 * | 5/2002 | Sasaki | 348/312 |
| 2003/0076420 | A1 * | 4/2003 | Akiyama et al. | 348/207.1 |
| 2003/0146915 | A1 * | 8/2003 | Brook et al. | 345/473 |
| 2004/0135889 | A1 * | 7/2004 | Koizumi et al. | 348/207.1 |
| 2004/0249861 | A1 * | 12/2004 | Hoshino et al. | 707/104.1 |
| 2009/0316169 | A1 * | 12/2009 | Katsunoi et al. | 358/1.9 |

FOREIGN PATENT DOCUMENTS

| | | |
|---|---|---|
| JP | 2005-346669 A | 12/2005 |
| JP | 2006-215880 A | 8/2006 |
| JP | 2006-338507 A | 12/2006 |
| JP | 2008-234065 A | 10/2008 |
| JP | 2009-058995 A | 3/2009 |
| JP | 2009-123091 A | 6/2009 |

OTHER PUBLICATIONS

Office Action issued for JP 2009-295946 (Feb. 18, 2014).

* cited by examiner

*Primary Examiner* — Henry Tsai
*Assistant Examiner* — Jing-Yih Shyu
(74) *Attorney, Agent, or Firm* — Drinker Biddle & Reath LLP

(57) ABSTRACT

An apparatus for processing data includes a plurality of signal processing units, each signal processing unit including a register that stores identification (ID) information to store a parameter, the signal processing units operative to sequentially perform an operation of storing the parameter or an operation of processing a signal in response to a mode control signal; a storage unit; a data reading unit that selectively reads parameter information or processing data from the storage unit; a data writing unit that selectively writes data corresponding to a data signal output by each of the signal processing units in the storage unit; and a control unit that outputs the mode control signal to each of the signal processing units. During the operation of storing the parameter, when the data signal corresponds to the ID information, each of the signal processing units writes a parameter included in the data signal in the register.

11 Claims, 8 Drawing Sheets

APPARATUS FOR AND METHOD OF PROCESSING DATA

CROSS-REFERENCE TO RELATED PATENT APPLICATIONS

This application claims the priority benefit of Japanese Patent Application No. 2009-295946, filed on Dec. 25, 2009, in the Japanese Patent Office and Korean Patent Application No. 10-2010-0130005, filed on Dec. 17, 2010, in the Korean Intellectual Property Office, the disclosures of which are incorporated herein in their entirety by reference.

BACKGROUND

1. Field of the Invention

Embodiments relate to an apparatus for and method of processing data, and more particularly, to an apparatus for and method of processing data, which may facilitate the design of software and hardware configured to set parameters and process signals and the arrangement of components in connection with a signal processing circuit configured to sequentially process input data signals.

2. Description of the Related Art

Parameters, such as filter coefficients and filter intensities, which are used to process signals, are given to a signal processing circuit configured to process various signals, such as an image signal indicating an image (a moving image or still image). That is, since the signal processing circuit processes signals in response to a given parameter, when the corresponding parameter is updated, the signal processing circuit may perform another processing operation in response to the updated parameter.

A technique of setting parameters used for processing digital signals using a register has been developed. An example of a technique of reading, by a direct memory access controller (DMAC), a parameter stored in a memory in response to an instruction of a central processing unit (CPU) and setting the parameter in the register is disclosed in Japanese Patent Laid-open Publication No. 2008-234065. Also, an example of a technique of reading, by a DMAC, a parameter stored in a memory by a processor and setting the parameter in a register is disclosed in Japanese Laid-open Publication No. 2009-123091.

FIG. 8 is a block diagram of a configuration of a conventional data processing apparatus 10. In the data processing apparatus 10, a CPU 12 may set (newly write/update) parameters of a register 14a configured to store a parameter corresponding to a data transmission circuit 16 configured to read a data signal from a bus 20 and registers 14b, 14c, and 14d configured to store parameters corresponding to respective signal processing circuits 18a, 18b, and 18c. That is, in the data processing apparatus 10, the CPU 12 may update the parameters stored in the registers 14b, 14c, and 14d so that the signal processing circuits 18a, 18b, and 18c can perform processing operations in response to the updated parameters.

In order that the CPU 12 may write parameters in the respective registers 14b, 14c, and 14d, software executed by the CPU 12 may need to comprehend addresses of the respective registers 14b, 14c, and 14d. Accordingly, as the number of the registers 14b, 14c, and 14d increases, a process of managing the addresses of the registers 14b, 14c, and 14d may become more complicated. This may increase a design burden of software or a circuit configured to drive the software. Also, when the number of signal processing circuits 18a, 18b, and 18c is increased or reduced or design of the signal processing circuits 18a, 18b, and 18c is varied in connection with the design of hardware, a decoding circuit of each of the registers 14b, 14c, and 14d should be reconfigured, thereby increasing a design burden of hardware.

According to a conventional implementation in the art (hereinafter, "Conventional Implementation 1") in which a DMAC reads a parameter stored in a memory and sets the parameter in a register based on an instruction of a CPU, the DMAC may set the parameter in the register in a single image processing module, which may correspond to one signal processing circuit shown in FIG. 8.

The Conventional Implementation 1 shown in FIG. 8 is not configured for a plurality of signal processing circuits that are configured to sequentially process data signals. Thus, when the Conventional Implementation 1 shown in FIG. 8 is applied to the plurality of signal processing circuits that are configured to sequentially process the data signals, the CPU gives instructions to the DMAC of each of the signal processing circuits. The Conventional Implementation 1 cannot solve the above-described problems of the conventional data processing apparatus 10.

Furthermore, according to another conventional implementation in the art (hereinafter, "Conventional Implementation 2") in which a DMAC reads a parameter, previously stored by a processor in a memory, and sets the parameter in a register, a register controller, which is an external component of a group of image processing modules corresponding to each of the signal processing circuits of FIG. 8, may set the parameter with respect to the corresponding group of image processing modules. That is, since the configuration of a data processing apparatus using the Conventional Implementation 2 is not basically different from that of the conventional data processing apparatus of FIG. 8, the Conventional Implementation 2 may still bring about the above-described problems of the conventional data processing apparatus 10.

SUMMARY

Embodiments include an apparatus for and method of processing data, which may facilitate the design of software and hardware configured to set parameters and process signals and the arrangement of components in connection with a signal processing circuit configured to sequentially process input data signals.

According to an embodiment, a data processing apparatus includes: a plurality of signal processing units, each signal processing unit including a register that stores intrinsic identification (ID) information and stores a parameter to be used for a signal processing operation, the signal processing units connected to one another and operative to transmit data signals in a predetermined sequential order and to select any one of a first processing operation of storing the parameter in the register based on an input data signal and a second processing operation of sequentially processing input data signals using the parameter in response to an input mode control signal; a storage unit that stores parameter information indicating parameters to be stored in the respective signal processing units and that stores processing data to be processed by the plurality of signal processing units; a data reading unit that selects the parameter information or the processing data from the storage unit, reads the parameter information or the processing data, and outputs a data signal corresponding to the read data to an initial signal processing unit out of the plurality of signal processing units; a data writing unit that selectively writes data corresponding to a data signal output by a final signal processing unit out of the plurality of signal processing units in the storage unit; and a control unit that outputs the mode control signal instructing each of the plurality of signal processing units to select any one of the first and second processing operations, leads the data reading unit to selectively read data, and leads the data writing unit to selectively write data. When the first processing operation is performed, each of the signal processing units determines whether the input data signal corresponds to the ID information and writes a parameter included in the data signal in the register when the input data signal corresponds to the ID information.

In the data processing apparatus having the above-described configuration, a data signal indicating processing data and a data signal indicating parameter information may be transmitted through the same data bus. Each of the signal processing units may perform the first processing operation of storing the parameter based on the input data signal in response to the mode control signal generated by the control unit and the second processing operation of processing the input data signal using the parameter.

In the above-described configuration, since the control unit does not need to manage an address on software, even if the number of registers is increased, a design burden of the corresponding software or circuit may not be increased.

Also, the corresponding parameter information may be specified using ID information stored in each of the signal processing units and the parameter may be written in the register. Thus, even if the number of signal processing circuits included in the signal processing units is increased or reduced or design of the signal processing circuits is varied, it may be unnecessary to reconfigure a decoding circuit of the register corresponding to each of the signal processing circuits.

Each of the signal processing units may include: a signal processing circuit that processes an input data signal using a parameter stored in the register; a setting unit that selects data corresponding to the ID information out of data indicated by the input data signal and writes a parameter included in the selected data in the register when the mode control signal instructs the first processing operation for setting the parameter, and does not write the parameter in the register when the mode control signal instructs the second processing operation; and a conversion unit that outputs the input data signal when the mode control signal instructs the first processing operation and outputs a data signal processed by the signal processing circuit.

The control unit may output a mode control signal instructing the first processing operation when the data reading unit reads the parameter information. Also, the control unit may output a mode control signal instructing the second processing operation based on a response signal indicating that the reading of the parameter information from the data reading unit is finished.

The apparatus may further include a selection unit that receives an externally input data signal indicating processing data to be processed by the plurality of signal processing units and a data signal output by the data reading unit. The selection unit may output the data signal output by the data reading unit to an initial signal processing unit out of the plurality of signal processing units when the mode control signal indicates the first processing operation. The selection unit may output the externally input data signal to the initial signal processing unit out of the plurality of signal processing units when the mode control signal indicates the second processing operation.

Another embodiment includes a method of processing data using a data processing apparatus, which includes a plurality of signal processing units, each signal processing unit including a register that stores intrinsic ID information and stores a parameter to be used for a signal processing operation, the signal processing units connected to one another and operative to transmit data signals in a predetermined sequential order and to select any one of a first processing operation of storing the parameter in the register based on an input data signal and a second processing operation of sequentially processing input data signals using the parameter in response to an input mode control signal. The method includes: determining whether the first processing operation or the second processing operation is to be performed based on the mode control signal instructing each of the signal processing units to select one of the first and second processing operations; determining whether the input data signal corresponds to the ID information when it is determined that the first processing operation is to be performed; and writing a parameter included in the data signal in the register when the input data signal corresponds to the ID information.

In the above-described method, each of the signal processing units may perform the first processing operation of storing the parameter based on the input data signal in response to a mode control signal or the second processing operation of processing the input data signal using the parameter. Also, when the parameter is stored based on the input data signal, each of the signal processing units may selectively write a parameter included in parameter information corresponding to ID information stored in the corresponding signal processing unit in the register.

In the above-described method, since the control unit does not need to manage an address on software, even if the number of registers is increased, a design burden of the corresponding software or circuit may not be increased.

Also, the corresponding parameter information may be specified using ID information stored in each of the signal processing units and the parameter may be written in the register. Thus, even if the number of signal processing circuits included in the signal processing units is increased or reduced or design of the signal processing circuits is varied, it may be unnecessary to reconfigure a decoding circuit of the register corresponding to each of the signal processing circuits.

The method may further include processing the data signal using the parameter stored in the register when it is determined that the second processing operation is to be performed.

In addition, the method may further include: selectively reading parameter information or processing data based on the mode control signal from a storage unit configured to store the parameter information and the processing data, the parameter information indicating the parameter to be written in the register during the first processing operation, the processing data to be processed during the second processing operation; and outputting the parameter information or the processing data read from the storage unit as the input data signal to the signal processing units.

The method may further include storing data corresponding to the data signal processed using the parameter stored in the register in the storage unit.

According to another embodiment, a data processing apparatus includes: a plurality of signal processing units, each signal processing unit including a register having ID information, the signal processing units sequentially connected to one another and operative to selectively execute a first processing operation of writing an externally input data signal as a parameter in the register and a second processing operation of processing the input data signal using the parameter written in the register; and a control unit that applies a mode control signal instructing the signal processing units to execute any one of the first processing operation and the second processing operation.

The apparatus may further include: a storage unit that stores parameter information indicating the parameter to be written in the register of each of the signal processing units and that stores processing data to be processed by each of the signal processing units; and a data reading unit that selectively reads the parameter information or the processing data from the storage unit and outputs a data signal corresponding to the read data to each of the signal processing units.

The apparatus may further include a data writing unit that writes data corresponding to the data signal processed and output by each of the signal processing units when the mode control signal instructs each of the signal processing units to perform the second processing operation.

BRIEF DESCRIPTION OF THE DRAWINGS

The above and other features and advantages will become more apparent by describing in detail exemplary embodiments with reference to the attached drawings in which.

DETAILED DESCRIPTION

Figure 1:
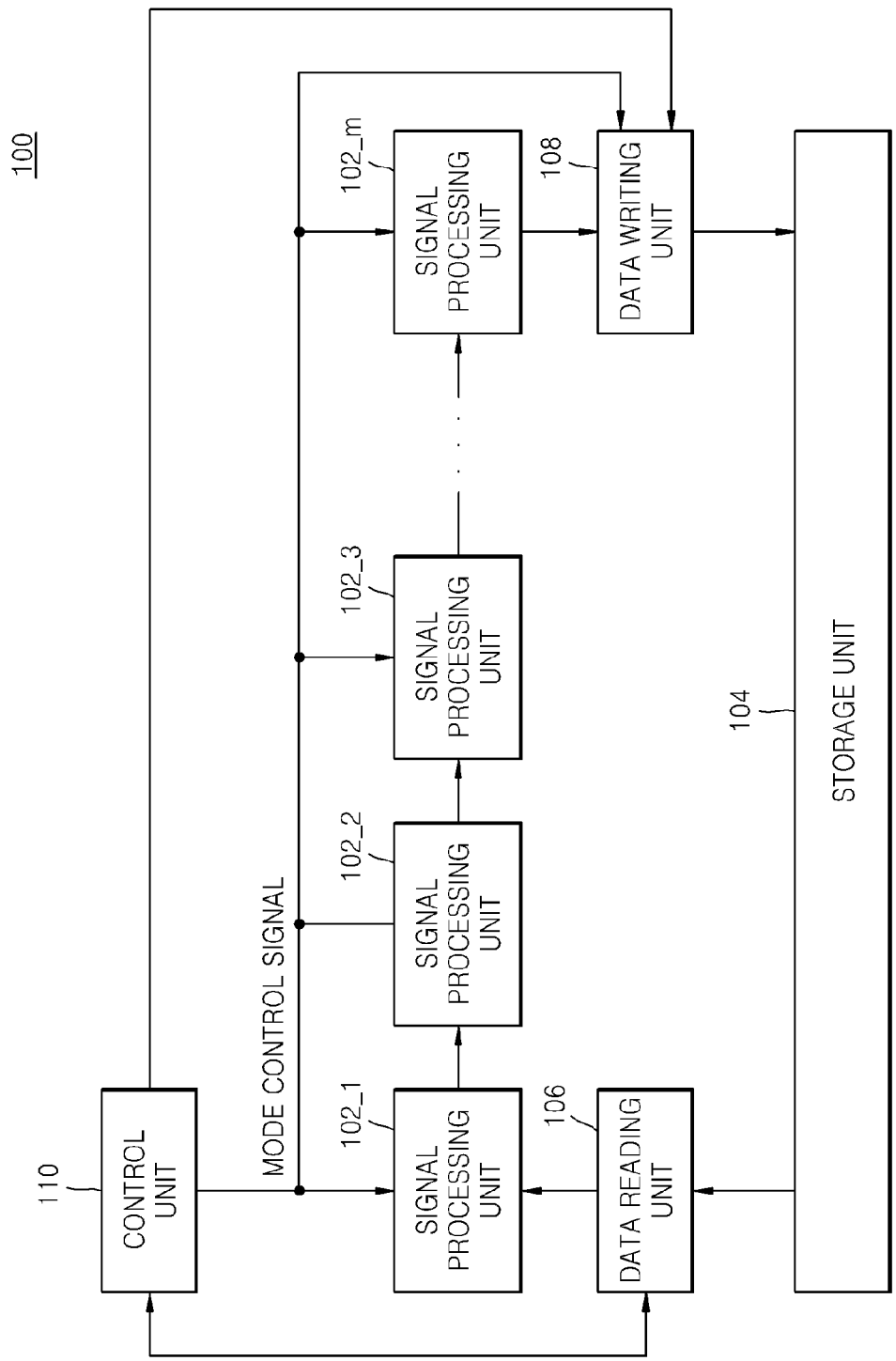
FIG. 1 is a block diagram of a configuration of a data processing apparatus according to an exemplary embodiment.

Exemplary embodiments of an apparatus for and method of processing data will now be described more fully with reference to the accompanying drawings. Like reference numerals in the drawings denote like elements, and thus their description will be omitted.

Data Processing Apparatus of Embodiment 1

FIG. 1 is a block diagram of a configuration of a data processing apparatus 100 according to an exemplary embodiment.

The data processing apparatus 100 may include signal processing units 102_1, 102_2, 102_3, ..., and 102_$m$ ($m$ is an integer equal to or greater than 2, thus the data processing apparatus 100 may include two, three, four, or more signal processing units, each of which is hereinafter generically named a signal processing unit 102), a storage unit 104, a data reading unit 106, a data writing unit 108, and a control unit 110.

In addition, the data processing apparatus 100 may include, for example, a read-only memory (ROM) (not shown) configured to write a program (software) used by the control unit 110 or control data, such as an operation parameter, therein; a random access memory (RAM) (not shown) configured to primarily store a program executed by the control unit 110 therein; a manipulation unit (not shown) configured to be manipulated by a user; a display unit (not shown); or a communication unit (not shown) configured to communicate data or signals with an external apparatus.

The manipulation unit may include, for example, a manipulation input device, such as a keyboard or mouse, a button, a directional key, or a combination thereof. In addition, the manipulation unit may function to receive inputs from an external apparatus, such as a remote controller.

Also, the display unit, which may be a display device included in the data processing apparatus 100, may display various display screens. A screen displayed on the display unit may be, for example, a screen on which an image (hereinafter, which refers to a moving image or still image) indicated by image data stored in the storage unit 104. The display unit may be, for example, a liquid crystal display (LCD) device or an organic light emitting diode (OLED) display device.

The communication unit may be a communication device included in the data processing apparatus 100, and may function to communicate data with an external apparatus by wire or wirelessly via a network or directly. The communication unit may be, for example, a local area network (LAN) terminal and a receiver circuit or an IEEE 802.15.1 port and a receiver circuit.

Each of the signal processing units 102 may include a register that stores intrinsic ID information and a parameter used to process signals. The signal processing unit 102 may perform a first processing operation of storing the parameter based on the input data signal in response to the mode control signal output by the control unit 110 or perform a second processing operation of processing the input data signal using the parameter.

Here, the mode control signal may be a signal indicating the kind of a processing operation, which may control a processing operation of each component of the data processing apparatus 100. For example, processing operations indicated by the mode control signal may include a parameter setting operation (hereinafter, simply referred to as the "first processing operation") of writing the parameter in the register and a signal processing operation (hereinafter, simply referred to as the "second processing operation") of processing the data signal.

The control unit 110 may be appropriately switched between signal levels (high level and low level) of, for example, an output mode control signal, and output a mode control signal indicating the kind of processing operation (first processing operation or second processing operation) to be executed.

When a mode control signal indicating the first processing operation is input, each of the signal processing units 102 may perform the first processing operation of storing parameters based on an input data signal.

Also, when a mode control signal indicating the second processing operation is input, each of the signal processing units 102 may perform an operation of processing the data signal using parameters.

As described above, each of the signal processing units 102 may select and perform one selected out of a plurality of processing operations in response to the input mode control signal. A detailed configuration and operation of the signal processing unit 102 will be described later.

The storage unit 104 may store parameter information (data) indicating parameters to be respectively stored in the signal processing units 102 and processing data to be processed by the signal processing unit 102. According to an embodiment, the processing data may be, for example, image data or voice data.

Figure 2:
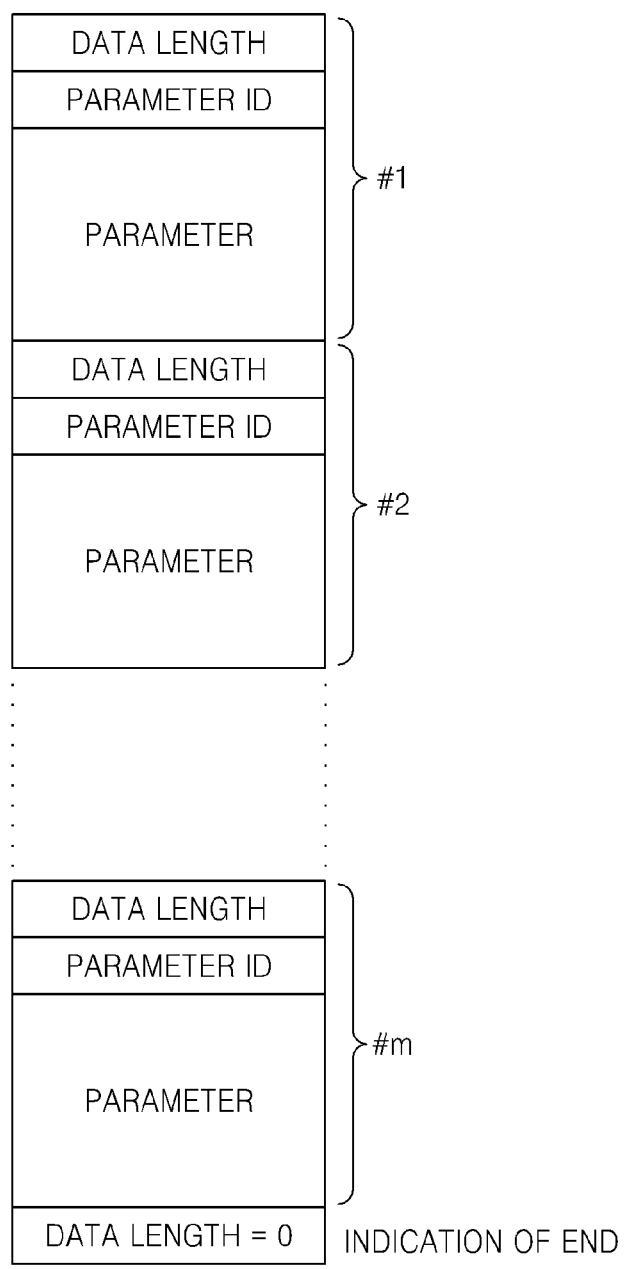
FIG. 2 is a diagram for explaining parameter information according to an exemplary embodiment.

FIG. 2 is a diagram for explaining parameter information according to an exemplary embodiment. The parameter information may include a "data length" indicating the word length of the parameter information, a "parameter identification (ID)" indicating the signal processing unit 102 using a parameter, and the "parameter" set in a register included in the signal processing unit 102.

FIG. 2 exemplarily illustrates a case where m pieces of parameter information corresponding to the number of the signal processing units 102 shown in FIG. 1 are stored as single data in the storage unit 104. Also, "Parameter ID" shown in FIG. 2 may correspond to intrinsic ID information included in each of the signal processing units 102.

By use of the above-described parameter information, when a data signal indicating parameter information shown in FIG. 2 is input, each of the signal processing units 102 may directly determine whether a parameter corresponding to the corresponding data signal is included therein.

The number of parameters included in "Parameter" shown in FIG. 2 is not limited to one and may be two or more. For example, the "Parameter" shown in FIG. 2 may include a plurality of parameters corresponding to the number of registers included in the signal processing unit 102.

Parameter information according to an embodiment may have a modified structure of a data structure shown in FIG. 2. For example, the parameter information according to the embodiment may be structured such that the orders of the "Data Length" and the "Parameter ID" shown in FIG. 2 are reversed. Alternatively, the "Parameter ID" may be set to a specific value instead of setting the "Data Length" indicating an end position of the parameter information to zero (0) as shown in FIG. 2.

In addition, all data lengths of a plurality of pieces of parameter information included in data shown in FIG. 2 may be previously written. Thus, even if modified parameter information is used, the data reading unit 106 may determine whether a process of reading parameter information from the storage unit 104 is finished as described later in operation S106.

In addition, the storage unit 104 may be, for example, a volatile memory device such as a synchronous dynamic random access memory (SDRAM), a nonvolatile memory device such as an electrically erasable and programmable read-only-memory (EEPROM) device, or a magnetic recording medium such as a hard disk. When the storage unit 104 is a volatile memory, the data processing apparatus 100 may further include a nonvolatile memory device or a magnetic recording medium.

The data reading unit 106 may selectively read parameter information or processing data from the storage unit 104 depending on the input of a read control signal output by the control unit 110. Also, the data reading unit 106 may output a data signal indicating the read parameter information or processing data to an initial signal processing unit 102_1 out of the plurality of signal processing units 102_1, 102_2, 102_3, . . . , and 102_m. Also, when the data reading unit 106 finishes reading data from the storage unit 104, the data reading unit 106 may transmit a response signal to a reading control signal to the control unit 110. Here, the data reading unit 106 may be, for example, a direct memory access controller (DMAC). In addition, although FIG. 1 illustrates the data reading unit 106 and the data writing unit 108 provided separately, the data reading unit 106 and the data writing unit 108 may constitute a single DMAC according to another exemplary embodiment.

Processing Operation of Data Reading Unit 106

Figure 3:
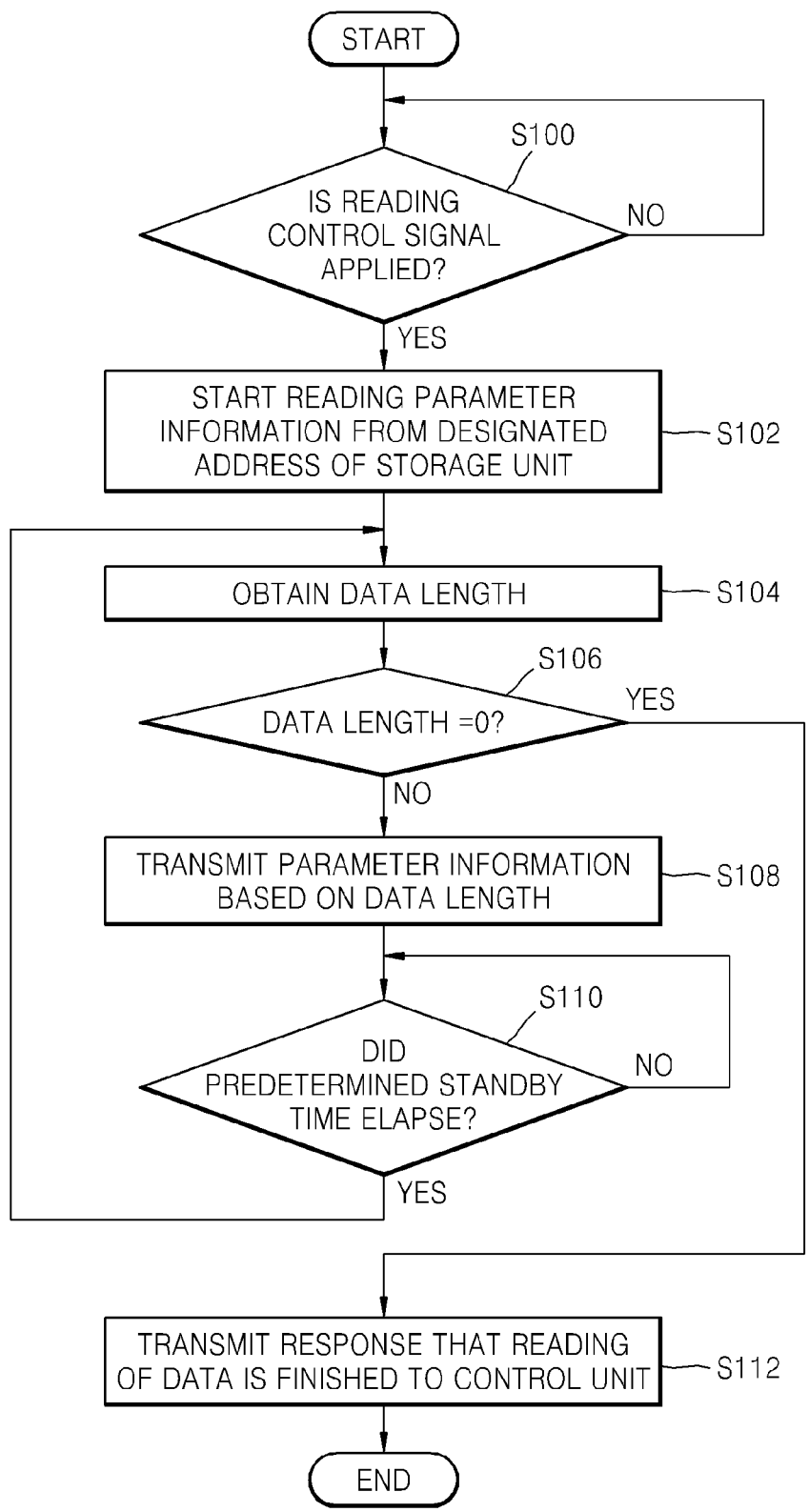
FIG. 3 is a flowchart illustrating processing operations of a data reading unit according to an exemplary embodiment.

FIG. 3 is a flowchart illustrating processing operations of the data reading unit 106 according to an exemplary embodiment. FIG. 3 exemplarily illustrates a case where the data reading unit 106 reads parameter information.

The data reading unit 106 may determine whether a reading control signal is input (S100). When it is not determined that the reading control signal is input, the data reading unit 106 may not perform a subsequent processing operation.

When it is determined that the reading control signal is input in operation S100, the data reading unit 106 may initiate reading parameter information from a designation address of the storage unit 104, which may be an address designated in response to the reading control signal (S102). In addition, when the reading control signal indicates the reading of processing data, the data reading unit 106 may read the processing data from the designated address of the storage unit 104 and output the read processing data to the signal processing unit 102_1.

The data reading unit 106 may obtain data "Data Length" (S104) and determine whether the "Data Length" is 0 (S106). The determination operation S106 may correspond to an operation of determining whether the reading of parameter information from the storage unit 104 is finished.

When it is not determined that "Data Length" is 0 in operation S106, the data reading unit 106 may output parameter information to the signal processing unit 102_1 based on the "Data Length" (S108). Here, since "Data Length" indicates the word length of parameter information, the data reading unit 106 may transmit parameter processing information corresponding to one signal processing unit 102 based on "Data Length" in operation S108. Also, the data reading unit 106 may transmit an ENABLE signal in synchronization with the transmission of the parameter information. Here, the ENABLE signal may indicate front and end positions of transmitted data with signal levels.

When parameter information is output to the signal processing unit 102_1 in operation S108, the data reading unit 106 may determine whether a predetermined standby time has elapsed after the processing operation S108 (S110). When it is not determined that the predetermined standby time has elapsed in operation S110, the data reading unit 106 may not perform a subsequent processing operation until it is determined that the predetermined standby time has elapsed. Here, the data reading unit 106 may not perform the processing operation until the predetermined standby time has elapsed so that a data signal might be differentiated from a next data signal.

In addition, when it is determined that the predetermined standby time has elapsed in operation S110, the data reading unit 106 may repeat the processing operation S104.

When it is determined that the "Data Length" is equal to 0 in operation S106, the data reading unit 106 may transmit a response signal indicating that the reading of data in response to the read control signal is finished to the control unit 110 (S112).

The data reading unit 106 may, for example, perform the processing operation of FIG. 3. Thus, the data reading unit 106 may read parameter information from the storage unit 104 and output the read parameter information to the signal processing unit 102_1.

Figure 4:
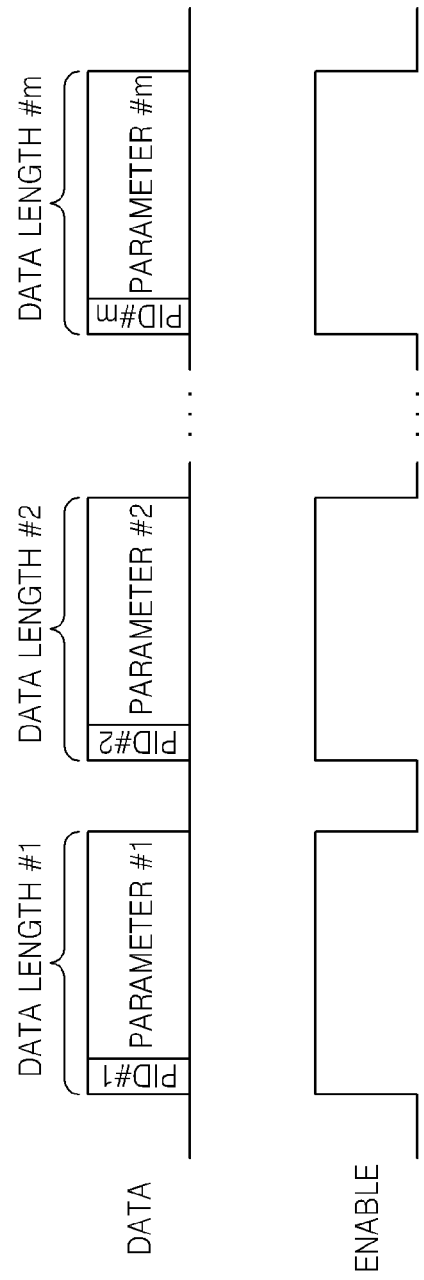
FIG. 4 is a diagram for explaining a data signal output by a data reading unit according to an exemplary embodiment.

FIG. 4 is a diagram for explaining a data signal output by the data reading unit 106 according to an exemplary embodiment, which exemplarily illustrates a case where the data reading unit 106 reads the parameter information of FIG. 2 through the processing operation of FIG. 3. As shown in FIG. 4, when the data reading unit 106 reads and outputs the parameter information, the data signal may respectively correspond to the parameter information #1, #2, . . . , #m shown in FIG. 2.

The data writing unit 108 may selectively write data corresponding to a data signal output by the signal processing unit 102_m, which is a final signal processing unit of the plurality of signal processing units 102_1, 102_2, 102_3, . . . , and 102_m, in the storage unit 104. More specifically, when the mode control signal indicates the second processing operation, the data writing unit 108 may write data corresponding to the data signal output by the signal processing unit 102_m in a designation address of the storage unit 104 indicated by a write control signal output by the control unit 110. Here, the data writing unit 108 may be, for example, a DMAC.

The control unit 110 may include, for example, a central processing unit (CPU) or an integrated circuit (IC) in which various processing circuits are integrated. The control unit 110 may function to control the entire data processing apparatus 100. Also, the control unit 110 may output a mode control signal to each of the signal processing units 102 and the data writing unit 108 so that the data reading unit 106 selectively reads data from the storage unit 104 and the data writing unit 108 selectively writes data to the storage unit 104.

More specifically, for example, when parameter information is read from the reading unit 106, the control unit 110 may output a reading control signal to read the parameter information and a mode control signal indicating the first processing operation of setting the parameter.

Thus, the data reading unit 106 may read the parameter information from the storage unit 104 and output the read parameter information to the signal processing unit 102 as shown in FIG. 4. Each of the signal processing units 102 may perform the first processing operation of storing parameters based on a data signal in response to the mode control signal indicating the first processing operation. Accordingly, parameters corresponding to the parameter information read by the data reading unit 106 may be written (newly written or updated) in the register included in each of the signal processing units 102.

In addition, the control unit 110 may output a mode control signal indicating the second processing operation of processing the data signal, for example, based on a response signal indicating that the reading of parameter information from the data reading unit 106 is finished. Thus, each of the signal processing units 102 may enter a mode in which an input data signal may be processed using a parameter in response to the mode control signal indicating the second processing operation.

Accordingly, the control unit 110 may output a reading control signal required for reading processing data to the data reading unit 106. Thus, the processing data may be read from the storage unit 104 and a data signal indicating the read processing data may be sequentially processed by each of the signal processing units 102. Also, data indicated by the processed data signal output by the signal processing unit 102_m may be written by the data writing unit 108 in the storage unit 104.

The data processing apparatus 100 according to an exemplary embodiment may have, for example, the configuration of FIG. 1 and perform an operation of setting parameters in the register included in each of the signal processing units 102 (or writing the parameters in the corresponding register) and an operation of processing signals in each of the signal processing units 102.

Configuration Example and Processing of the Signal Processing Unit 102

Hereinafter, the configuration of a signal processing unit 102 according to an exemplary embodiment and an operation of setting parameters in the signal processing unit 102 will be described in more detail.

Figure 5:
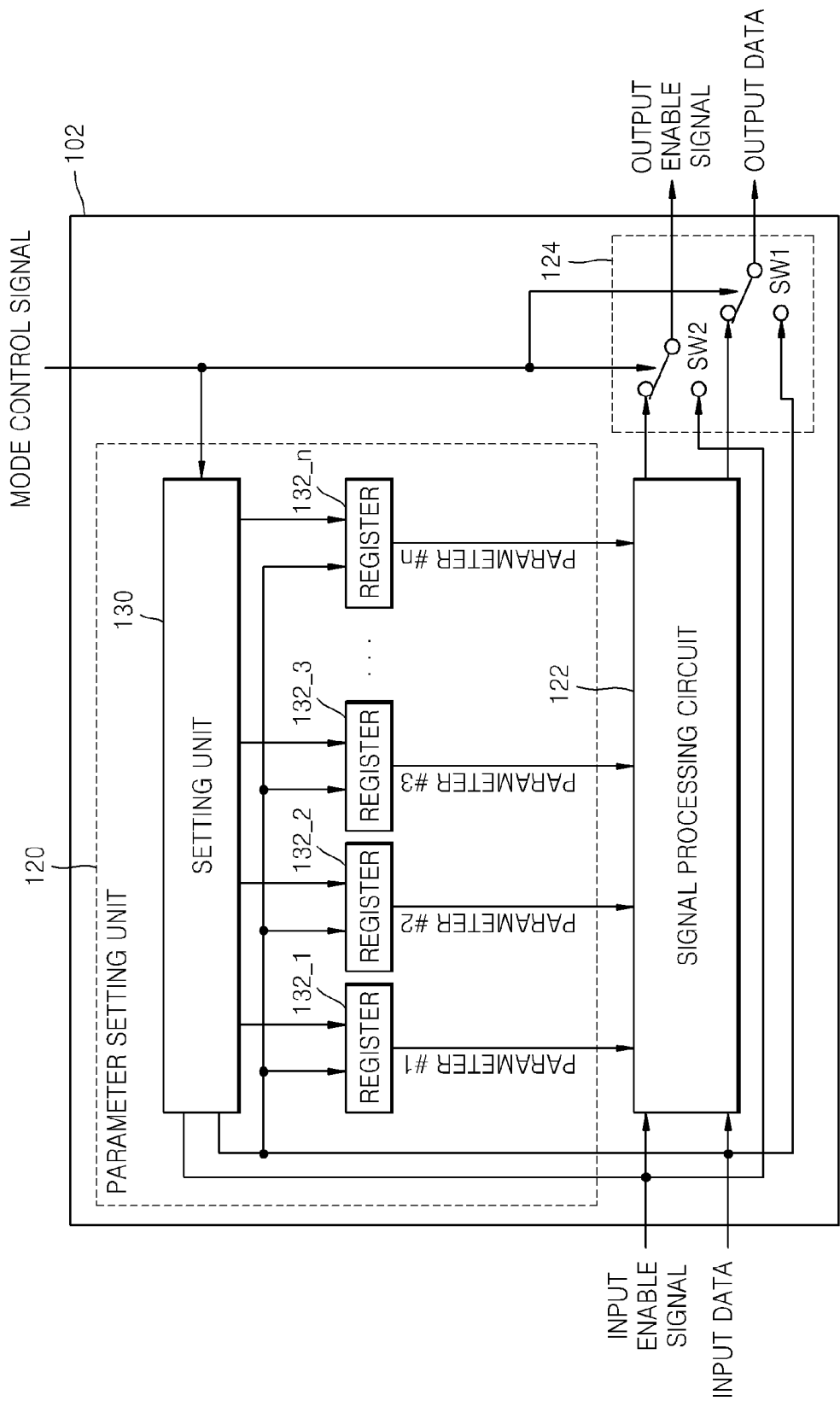
FIG. 5 is a block diagram of a configuration of a signal processing unit according to an exemplary embodiment.

FIG. 5 is a block diagram of a configuration of a signal processing unit 102 according to an exemplary embodiment. The signal processing unit 102 may include a parameter setting unit 120, a signal processing circuit 122, and a conversion unit 124. Also, the signal processing unit 102 may store intrinsic ID information.

The signal processing unit 102, which may, for example, include a ROM (not shown), may store ID information in the corresponding ROM, and a setting unit 130 may appropriately read ID information from the corresponding ROM. In addition, the ID information may be stored in the setting unit 130.

The parameter setting unit 120 may include the setting unit 130 and n registers 132_1, 132_2, 132_3, 132_n (n is an integer equal to or more than 1, thus the parameter setting unit 120 may include one, two, three, four, or more registers, hereinafter collectively referred to as registers 132) in which parameters may be stored. The parameter setting unit 120 may selectively perform an operation of storing the parameters based on an input data signal in response to the input mode control signal.

More specifically, when the mode control signal indicates the first processing operation, the parameter setting unit 120 may receive the input data signal (data column) as parameter information and store the parameters.

Also, when the mode control signal indicates the second processing operation, the parameter setting unit 120 may receive the input data signal as processing data and avoid or omit storing the parameters.

The setting unit 130 may play a leading part in setting the parameters in each of the signal processing units 102. More specifically, each of the mode control signal, the input data signal, and an input ENABLE signal may be applied to the setting unit 130, and the parameters may be selectively written in the registers 132 in response to the mode control signal.

Here, when the mode control signal indicates the first processing operation, the input data signal may be, for example, data shown in FIG. 4. When the mode control signal indicates the first processing operation, the setting unit 130 may select data corresponding to ID information out of data indicated by the input data signal and write a parameter included in the selected data in each of the registers 132 corresponding to the corresponding parameter. Also, when the mode control signal indicates the second processing operation, the setting unit 130 may not write parameters in the registers 132.

Figure 6:
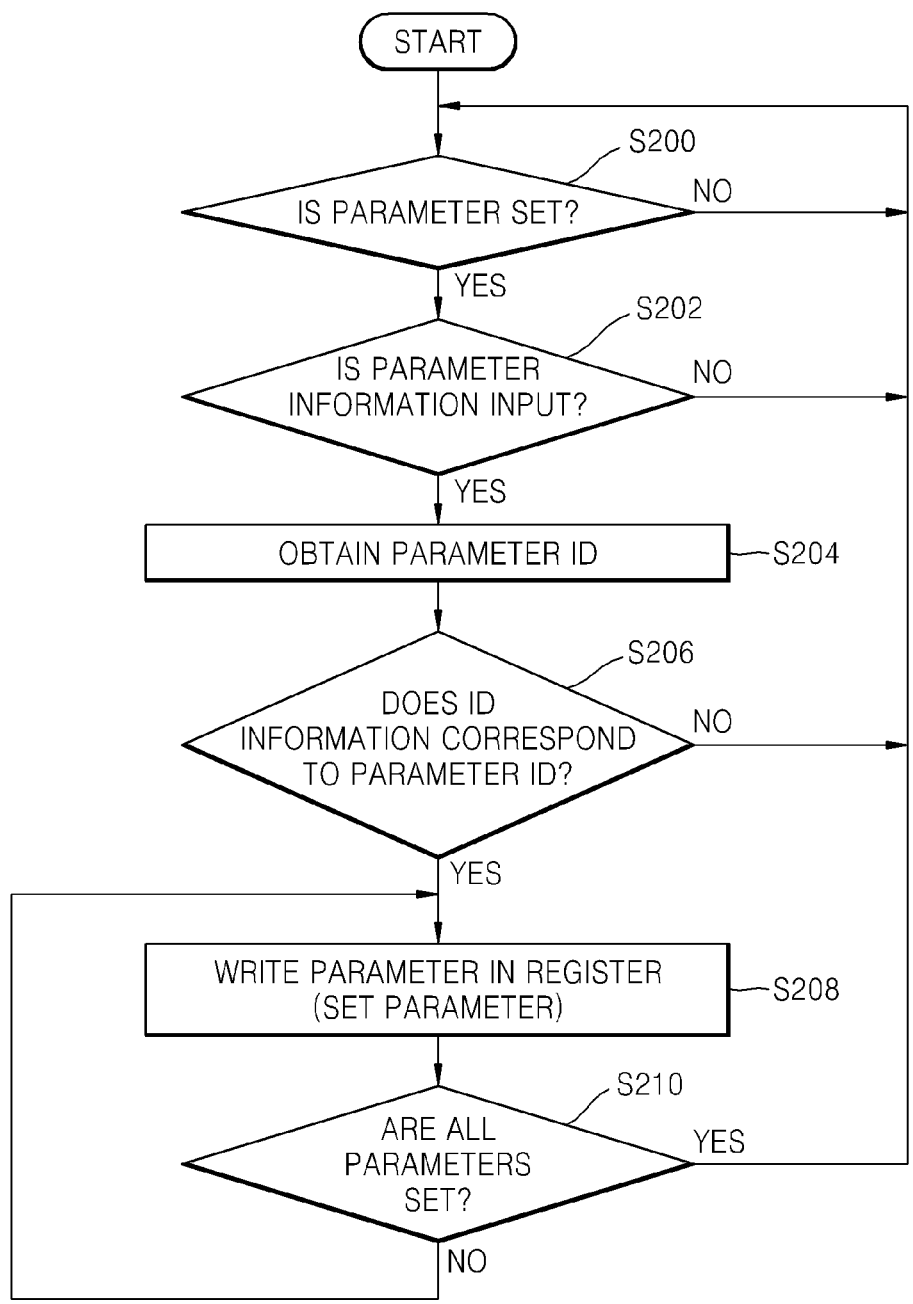
FIG. 6 is a diagram for explaining a method of processing data according to an exemplary embodiment, which illustrates an example of an operation of setting parameters in a signal processing unit.

FIG. 6 is a diagram for explaining a method of processing data according to an exemplary embodiment, which illustrates an example of an operation of setting parameters in the signal processing unit 102. Hereinafter, it is assumed that the operation shown in FIG. 6 is performed by the setting unit 130.

The setting unit 130 may determine whether parameters are to be set based on a mode control signal (S200). When the mode control signal indicates a first processing operation, for example, when the mode control signal is at a high level, the setting unit 130 may determine that the parameters are set. When the setting unit 130 does not determine that the parameters are set in operation S200, a subsequent processing operation may not be performed until the setting unit 130 determines that the parameters are set.

Also, when it is determined that the parameters are set in operation S200, the setting unit 130 may determine whether parameter information is input (S202). For example, when a signal level of an ENABLE signal is switched from a low level to a high level, the setting unit 130 determines that parameter information is input.

When it is not determined that the parameter information is input in operation S202, the setting unit 130 may repeat the operation S200.

Also, when it is determined that the parameter information is input in operation S202, the setting unit 130 may obtain "Parameter ID" from data (e.g., data shown in FIG. 4) indicated by the input data signal (S204).

Thereafter, the setting unit 130 may determine whether the intrinsic ID information of the signal processing unit 102 corresponds to the "Parameter ID" obtained in operation S204 (S206). The determination operation S206 may correspond to an operation of determining whether input parameter information includes a parameter used by the signal processing circuit 122 to process signals. For example, when the intrinsic ID information of the signal processing unit 102 corresponds to the "Parameter ID" obtained from the input data signal, the setting unit 130 may determine that the parameter indicated by the obtained "Parameter ID" is the corresponding parameter to be stored by the signal processing unit 102.

When it is determined that the intrinsic ID information does not correspond to the "Parameter ID" in operation S206, the setting unit 130 may repeat the processing operation S200.

Also, when it is determined that the intrinsic ID information corresponds to the "Parameter ID" in operation S206, the setting unit 130 may write a parameter included in data indicated by the data signal in the respective register 132 (S208; parameter setting process).

When the parameter is set in operation S208, it may be determined whether all parameters included in data indicated by the data signal are set (S210). When it is not determined that all the parameters are set in operation S210, the setting unit 130 may repeat the processing operation S208.

When it is determined that all the parameters are set in operation S210, the setting unit 130 may enter a standby mode in which the setting unit 130 waits for the input of next parameter information.

In the signal processing unit 102, the setting unit 130 may perform, for example, the processing operation shown in FIG. 6 so that the corresponding parameter information can be selected out of a plurality of pieces of parameter information input in a sequential order as shown in FIG. 4 and a parameter included in the selected parameter information can be written in the respective register 132.

Also, when the mode control signal does not indicate the first processing operation of setting the parameter, the setting unit 130 may not write any data in the register 132. Thus, even if processing data is input, the parameter stored in the register 132 may not be updated.

The parameter setting unit 120 may include the setting unit 130 and the registers 132 and selectively perform an operation of storing parameters based on an input data signal in response to an input mode control signal.

An example of a configuration of the signal processing unit 102 will be described with reference back to FIG. 5. The signal processing circuit 122 may process input data signals using parameters stored in the registers 132 and output processed data signals to the conversion unit 124. Also, the signal processing circuit 122 may output an output ENABLE signal synchronized with the output data signal along with the processed data signal.

In addition, although not shown in FIG. 5, when the mode control signal indicates the first processing operation for setting a parameter, the signal processing circuit 122 may not perform the first processing operation. As a result, the power consumption of the signal processing unit 102 may be reduced.

The conversion unit 124 may selectively output one of a data signal input to the signal processing unit 102, which is an input data signal to be processed by the signal processing circuit 122, or a data signal processed by the signal processing circuit 122 based on the mode control signal, using a switch SW1.

More specifically, the conversion unit 124 may output the input data signal when the mode control signal indicates the first processing operation, and output the data signal processed by the signal processing circuit 122 when the mode control signal indicates the second processing operation. Also, the conversion unit 124 may output the input ENABLE signal when the mode control signal indicates the first processing operation, and output the processed data signal output by the signal processing circuit 122 and the ENABLE signal output by the signal processing circuit 122 in synchronization with the data signal.

The conversion unit 124 may include, for example, a switch SW2 configured to output an ENABLE signal input in response to a mode control signal and an ENABLE signal output by the signal processing circuit 122.

The signal processing unit 102 may have, for example, the configuration of FIG. 5. Here, when the mode control signal indicates the first processing operation, the signal processing unit 102 may selectively write a parameter in the respective register 132 based on the input data signal and simultaneously, output the input data signal to a rear-end signal processing unit 102 (or data writing unit 108).

Also, when the mode control signal indicates the second processing operation, the signal processing unit 102 may process the input data signal and output the processed data signal to the rear-end signal processing unit 102 (or data writing unit 108).

Accordingly, the data processing apparatus 100 may include, for example, the signal processing unit 102 having the configuration of FIG. 5 so that a data signal indicating processing data and a data signal indicating parameter information may be transmitted to the same data bus. Also, a parameter corresponding to each of the registers included in each of the signal processing units 102 may be selectively written.

Figure 8:
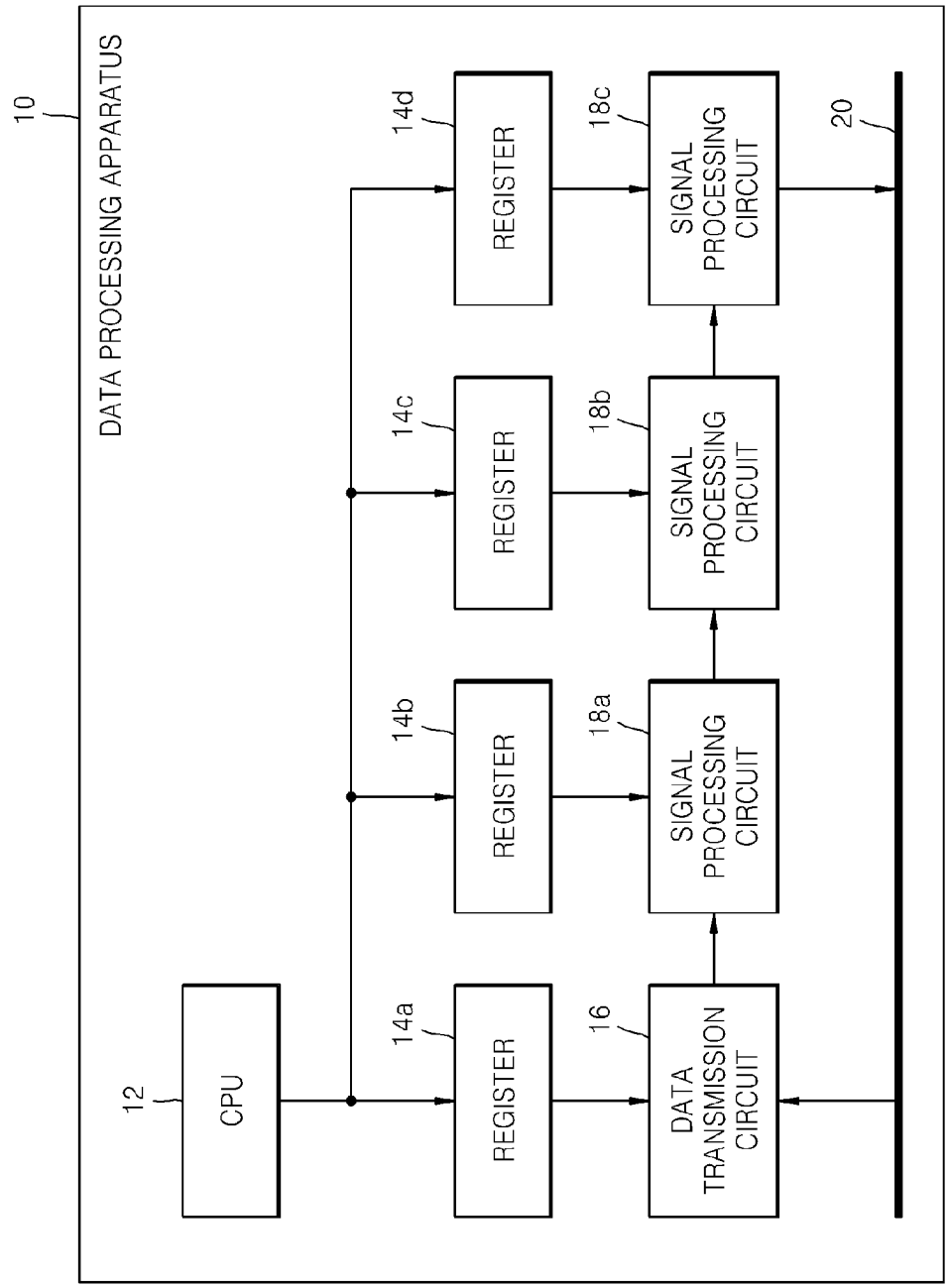
FIG. 8 is a block diagram of a configuration of a conventional data processing apparatus.

As described above, since the data processing apparatus 100 according to an exemplary embodiment may transmit the data signal indicating processing data and the data signal indicating the parameter information to the same data bus, it may be unnecessary to provide a register for storing parameters therein outside the signal processing unit 102 unlike the conventional data processing apparatus 10 shown in FIG. 8.

Furthermore, since no registers are disposed on an address of a CPU constituting the control unit 110 in the data processing apparatus 100, the data processing apparatus 100 does not need to manage an address on software executed by the corresponding CPU. Accordingly, even if the number of registers is increased, the data processing apparatus 100 may not increase a design burden of software or circuits unlike the conventional data processing apparatus 10.

In addition, even if the number of the registers is increased, since the data processing apparatus 100 does not need to manage the address on the software executed by the CPU constituting the control unit 110, it is unlikely that address setting errors will occur during the design of the software or the arrangement of components.

In the data processing apparatus 100, when a parameter is written in a register of each of the signal processing units 102, each of the signal processing units 102 may specify parameter information corresponding to stored ID information and write the parameter in the register. That is, in the data processing apparatus 100, a required parameter may be set in each of the signal processing units 102 irrespective of an input order (e.g., an order #m of FIG. 4) of parameter information input to each of the signal processing units 102. Accordingly, even if the number of signal processing circuits is increased or reduced or design of the signal processing circuits is varied, since it is unnecessary to reconfigure a decoding circuit of the registers 132 corresponding to each of the signal processing units 102, the data processing apparatus 100 may be free from a design burden of hardware unlike the conventional data processing apparatus 10.

Therefore, the data processing apparatus 100 may facilitate the design of software and hardware configured to set parameters used to process input data signals and the arrangement of components in connection with a signal processing circuit configured to sequentially process the input data signals.

Data Processing Apparatus of Embodiment 2

Figure 7:
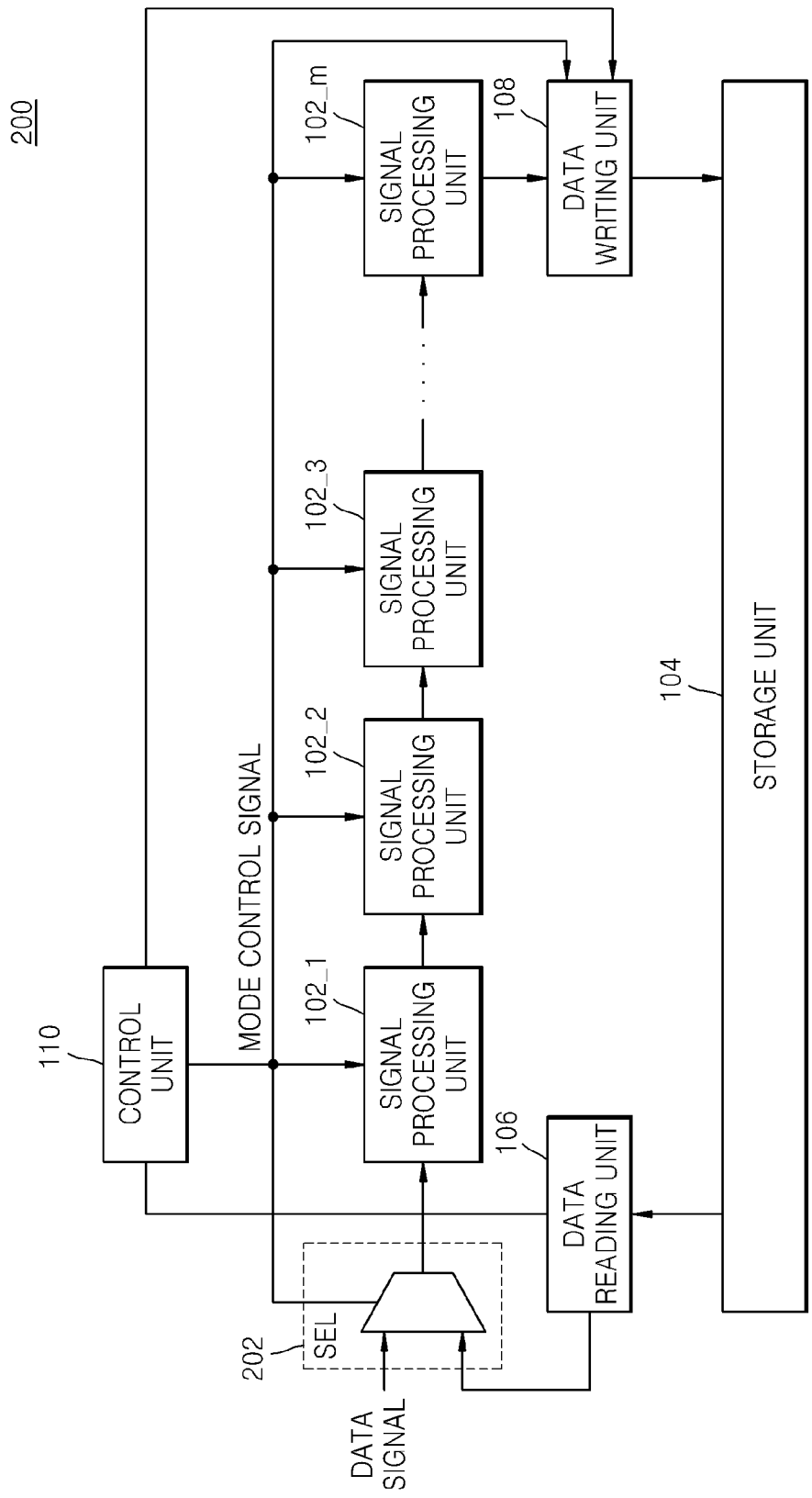
FIG. 7 is a block diagram of a configuration of a data processing apparatus according to another exemplary embodiment.

FIG. 7 is a block diagram of a configuration of a data processing apparatus 200 according to another exemplary embodiment. The data processing apparatus 200 may have basically the same configuration as the data processing apparatus 100 of FIG. 1 and further include a selection unit 202. FIG. 7 illustrates an example of the selection unit 202, which may include a selector SEL.

The selection unit 202 may receive an externally input data signal input from the outside of the data processing apparatus 200 (hereinafter, referred to as an input data signal) and a data signal output by a data reading unit 106. The input data signal may be processed by each of the signal processing units 102. Here, the data signal externally input to the selection unit 202 may be, for example, imaging data (or image data) output by an imaging device (not shown) or an imaging unit included in the data processing apparatus 200, image data transmitted from an external apparatus, or voice data.

Also, the selection unit 202 may output the input data signal or the data signal output by the data reading unit 106 to an initial signal processing unit 102_1 out of a plurality of signal processing units 102 in response to an input mode control signal.

More specifically, the selection unit 202 may output a data signal (i.e., a data signal indicating parameter information) output by the data reading unit 106 to the signal processing unit 102_1 when the mode control signal indicates the first processing operation for setting a parameter. Similar to the signal processing unit 102 of FIG. 1 according to an exemplary embodiment, the parameter may be written in the respective register 132 included in each of the signal processing units 102.

Also, when the mode control signal indicates the second processing operation for processing the data signal, the selection unit 202 may output the input data signal to the signal processing unit 102_1. Similar to the signal processing unit 102 of FIG. 1 according to an exemplary embodiment, in each of the signal processing units 102, the input data signal may be processed by the signal processing circuit 122, and data indicated by the processed data signal may be written by the data writing unit 108 in the storage unit 104.

The data processing apparatus 200 according to the present embodiment may have the same configuration as the data processing apparatus 100 of FIG. 1 except that the apparatus 200 includes the selection unit 202. Accordingly, similar to the data processing apparatus 100 of FIG. 1, the data processing apparatus 200 may transmit a data signal indicating processing data and a data signal indicating parameter information to the same data bus. Thus, unlike the conventional data processing apparatus 10 shown in FIG. 8, it may be unnecessary to dispose a register for storing a parameter outside the signal processing unit 102.

In addition, similar to the data processing apparatus 100 of FIG. 1, since the data processing apparatus 200 does not need to manage an address on software executed by a CPU constituting a control unit 110, even if the number of registers is increased, a design burden of the software or an arrangement burden of components may not be increased. Also, similar to the data processing apparatus 100 of FIG. 1, address setting errors may be reduced during the design of software or the arrangement of components.

Furthermore, similar to the data processing apparatus 100 of FIG. 1, in the data processing apparatus 200, when a parameter is written in a register included in each of the signal processing units 102, each of the signal processing units 102 may specify parameter information corresponding to stored ID information and write the parameter in the register. Accordingly, similar to the data processing apparatus 100 of FIG. 1, even if the number of signal processing circuits is increased or reduced or design of the signal processing circuits is varied, the data processing apparatus 200 does not need to reconfigure a decoding circuit of the registers 132 corresponding to each of the signal processing units 102, and a design burden of hardware may be reduced unlike the conventional data processing apparatus 10.

Accordingly, similar to the data processing apparatus 100 of FIG. 1, the data processing apparatus 200 may facilitate the design of software and hardware configured to set parameters used to process input data signals and the arrangement of components in connection with a signal processing circuit configured to sequentially process the input data signals.

Although the data processing apparatus has been explained thus far with reference to the above-described embodiments, the embodiments may be applied to various apparatuses, for example, imaging devices such as digital still cameras or digital video cameras, display apparatuses such as liquid crystal display (LCD) devices or organic light emitting diode (OLED) display devices, a receiver apparatus configured to receive television broadcasting, and computers such as personal computers (PCs) and servers.

According to the invention as described above, an apparatus for and method of processing data facilitates the design of software and hardware configured to set parameters used to process input data signals and the arrangement of components in connection with a signal processing circuit configured to sequentially process the input data signals.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A data processing apparatus comprising:

a plurality of signal processing units, each of the plurality of signal processing units including a register that stores intrinsic identification (ID) information and stores a parameter to be used for a signal processing operation, the plurality of signal processing units operatively connected to one another and operative to transmit respective output data signals in a predetermined sequential order and to select any one of a first processing operation of storing the parameter in the register based on an input data signal and a second processing operation of sequentially processing the input data signal using the parameter stored in the register in response to a first mode control signal that corresponds to the first processing operation or a second mode control signal that corresponds to the second processing operation;

a storage unit that stores parameter information indicating parameters to be stored in the respective signal processing units and that stores signal processing data to be processed by the plurality of signal processing units;

a data reading unit that selects the parameter information or the signal processing data from the storage unit, reads a first data signal that includes the parameter information or the signal processing data, and outputs the first data signal as the input data signal to an initial signal processing unit of the plurality of signal processing units;

a data writing unit that selectively writes a second data signal corresponding to an output data signal of a final signal processing unit of the plurality of signal processing units in the storage unit; and a control unit that outputs the first mode control signal to each of the plurality of signal processing units to select the first processing operation, outputs the second mode control signal to each of the plurality of signal processing units to select the second processing operation, controls the data reading unit to selectively read the first data signal from the storage unit, and controls the data writing unit to selectively write the second data signal in the storage unit, wherein when the first processing operation is performed, each of the plurality of signal processing units determines whether a parameter ID included in the input data signal corresponds to the intrinsic ID information and writes a corresponding parameter included in the input data signal in the register when the parameter ID of the input data signal corresponds to the intrinsic ID information.

2. The apparatus of claim 1, wherein each of the plurality of signal processing units includes:
a signal processing circuit that processes the input data signal using the parameter stored in the register and outputs a processed data signal;
a setting unit that selects parameter data that includes the corresponding parameter from the input data signal and writes the corresponding parameter included in the selected parameter data in the register during the first processing operation, and does not write in the register during the second processing operation; and
a conversion unit that outputs the input data signal during the first processing operation and outputs the processed data signal during the second processing operation.

3. The apparatus of claim 2, wherein the control unit outputs the first mode control signal when the data reading unit reads the first data signal that includes the parameter information,
and the control unit outputs the second mode control signal based on a response signal indicating that the reading of the first data signal that includes the parameter information by the data reading unit is finished.

4. The apparatus of claim 2, further comprising a selection unit that
receives an external data signal that includes signal processing data to be processed by the plurality of signal processing units and receives the first data signal from the data reading unit,
outputs the first data signal to the initial signal processing unit of the plurality of signal processing units upon receipt of the first mode control signal, and
outputs the external data signal to the initial signal processing unit of the plurality of signal processing units upon receipt of the second mode control signal.

5. A method of processing data using a data processing apparatus comprising a plurality of signal processing units, each of the plurality of signal processing units including a register that stores intrinsic identification (ID) information and stores a parameter to be used for a signal processing operation, the plurality of signal processing units operatively connected to one another and operative to transmit respective output data signals in a predetermined sequential order and to select any one of a first processing operation of storing the parameter in the register based on an input data signal and a second processing operation of sequentially processing the input data signal using the parameter in response to a first mode control signal that corresponds to the first processing operation or a second mode control signal that corresponds to the second processing operation, the method comprising:
determining whether the first processing operation or the second processing operation is to be performed based on the first mode control signal or the second mode control signal;
determining whether a parameter ID included in the input data signal corresponds to the intrinsic ID information when it is determined that the first processing operation is to be performed; and
writing a corresponding parameter included in the input data signal in the register during the first processing operation when the parameter ID corresponds to the intrinsic ID information.

6. The method of claim 5, further comprising processing the input data signal using the parameter stored in the register when it is determined that the second processing operation is to be performed.

7. The method of claim 6, further comprising:
selectively reading parameter information or signal processing data, based on the first mode control signal or the second mode control signal, from a storage unit configured to store the parameter information and the signal processing data, the parameter information indicating the parameter to be written in the register during the first processing operation, the signal processing data to be processed during the second processing operation; and
outputting the parameter information or the signal processing data as the input data signal to an initial signal processing unit of the plurality of signal processing units.

8. The method of claim 6, further comprising storing a second data signal corresponding to an output data signal of a final signal processing unit of the plurality of signal processing units in the storage unit.

9. A data processing apparatus comprising:
a plurality of signal processing units, each of the plurality of signal processing units including a register having identification (ID) information, the plurality of signal processing units sequentially connected to one another and operative to selectively execute a first processing operation of writing an externally input data signal as a parameter in the register and a second processing operation of processing the externally input data signal using the parameter written in the register to transmit an output data signal; and
a control unit that applies a first mode control signal that corresponds to the first processing operation or a second mode control signal that corresponds to the second processing operation to the plurality of signal processing units to execute any one of the first processing operation and the second processing operation;
wherein when the first processing operation is performed, each of the plurality of signal processing units determines whether a parameter ID of the externally input data signal corresponds to the ID information and writes a corresponding parameter included in the externally input data signal in the register when the parameter ID of the externally input data signal corresponds to the ID information.

10. The apparatus of claim 9, further comprising:
a storage unit that stores parameter information indicating the parameter to be written in the register and that stores signal processing data to be processed by each of the plurality of signal processing units; and
a data reading unit that selectively reads a first data signal that includes the parameter information or the signal processing data from the storage unit and outputs the first data signal to each of the plurality of signal processing units.

11. The apparatus of claim 10, further comprising a data writing unit that writes a second data signal corresponding to the output data signal of a final signal processing unit of the plurality of signal processing units in the storage unit during the second processing operation.

* * * * *